(12) United States Patent
Bradfield

(10) Patent No.: US 11,469,647 B2
(45) Date of Patent: Oct. 11, 2022

(54) OIL COOLING SYSTEM FOR A STATOR OF AN ELECTRIC MACHINE

(71) Applicant: BorgWarner Inc., Auburn Hills, MI (US)

(72) Inventor: Michael Duane Bradfield, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 176 days.

(21) Appl. No.: 16/887,318

(22) Filed: May 29, 2020

(65) Prior Publication Data

US 2020/0389070 A1  Dec. 10, 2020

Related U.S. Application Data

(60) Provisional application No. 62/858,572, filed on Jun. 7, 2019.

(51) Int. Cl.
*H02K 9/19* (2006.01)
*H02K 3/32* (2006.01)
(Continued)

(52) U.S. Cl.
CPC ............. *H02K 9/19* (2013.01); *H02K 1/14* (2013.01); *H02K 3/32* (2013.01); *H02K 3/521* (2013.01)

(58) Field of Classification Search
CPC .. H02K 1/14; H02K 1/16; H02K 3/32; H02K 3/34; H02K 3/345; H02K 3/487; H02K 3/52; H02K 3/521; H02K 9/19
(Continued)

(56) References Cited

U.S. PATENT DOCUMENTS 5,763,978 A * 6/1998 Uchida ............... H02K 3/325
310/214
7,952,240 B2  5/2011 Takenaka et al.
(Continued)

FOREIGN PATENT DOCUMENTS

CN  108011466 A  5/2018
JP  2014042414 A  3/2014

OTHER PUBLICATIONS

Sasaki et al., English Machine Translation of JP 2014042414 (Year: 2014).*

(Continued)

*Primary Examiner* — Rashad H Johnson
(74) *Attorney, Agent, or Firm* — Cantor Colburn LLP

(57) ABSTRACT

An electric machine including a rotor and a stator positioned about the rotor. The stator includes a stator core having a plurality of stator teeth and a plurality of stator windings supported by the stator core about the plurality of stator teeth. The plurality of stator windings include a first end turn and a second end turn. The stator includes a plurality of interlocking insulators extending about corresponding ones of the plurality of stator teeth. Each of the plurality of interlocking insulators includes a first base portion extending circumferentially outwardly in a first direction and a second base portion extending circumferentially outwardly in a second direction. The first base portion being configured to inter-engage with a second base portion on an adjacent interlocking insulator to form a coolant passage and a coolant barrier about the air gap.

12 Claims, 7 Drawing Sheets

(51) Int. Cl.
*H02K 3/52* (2006.01)
*H02K 1/14* (2006.01)

(58) Field of Classification Search
USPC ......... 310/52, 54, 58, 64, 216.095, 216.105, 310/216.115
See application file for complete search history.

(56) References Cited

U.S. PATENT DOCUMENTS

| | | | |
|---|---|---|---|
| 9,024,500 B2 | 5/2015 | Kimura et al. | |
| 9,312,730 B2* | 4/2016 | Santos .................. | H02K 1/148 |
| 10,756,599 B2 | 8/2020 | Yim et al. | |
| 2003/0214197 A1* | 11/2003 | De Luca .............. | H02K 5/1282 |
| | | | 310/216.084 |
| 2004/0189136 A1* | 9/2004 | Kolomeitsev ......... | H02K 3/345 |
| | | | 310/216.082 |
| 2010/0045125 A1* | 2/2010 | Takenaka ............... | H02K 9/19 |
| | | | 310/54 |
| 2019/0097499 A1* | 3/2019 | Yim ...................... | H02K 7/006 |
| 2021/0242729 A1* | 8/2021 | Tabuchi .................. | H02K 1/32 |
| 2021/0296954 A1* | 9/2021 | Hoerz .................... | B60K 1/00 |

OTHER PUBLICATIONS

International Search Report and Written Opinion for International Application No. PCT/US2020/035652; International Filing Date Jun. 2, 2020; dated Sep. 23, 2020 (pp. 1-8).

\* cited by examiner

OIL COOLING SYSTEM FOR A STATOR OF AN ELECTRIC MACHINE

CROSS REFERENCE TO RELATED APPLICATIONS

This application claims the benefit of an earlier filing date from U.S. Provisional Application Ser. No. 62/858,572 filed Jun. 7, 2019, the entire disclosure of which is incorporated herein by reference.

BACKGROUND OF THE INVENTION

Electric machines include a housing, a rotor that support a rotor winding, and a stator that supports a stator winding. The rotor is rotated within the stator to generate an electrical field that produces an electrical current. An air gap exists between the rotor and the stator. During operation, producing the electrical field results in the generation of heat in the stator. This heat may reduce operational efficiency of the electric machine. Various systems have been employed to reduce heat generated by operation of the electric machine. For example, often times the rotor will support a fan that draws air currents through the housing.

Other machines may include a liquid coolant, such as oil, that is distributed onto portions of the stator. For example, oil may be dropped onto stator end turns, collected in the housing, removed, passed through a heat exchanger, and then re-introduced into the electric machine. In other systems, the coolant may be passed through passages formed in the stator core and over stator end turns. Passing coolant through the stator core results in indirect cooling of the stator winding arranged therein.

Indirect cooling is not as efficient as direct contact between the liquid coolant and the stator winding. Flowing coolant over the stator windings in the stator core could result in intrusion into the air gap. It is desirable to maintain the air gap relatively free of liquid coolant. Allowing too much liquid coolant to enter the air gap could impede operation of the electric machine. Accordingly, the industry would welcome a system that provided for direct cooling of stator windings in a stator core while maintaining the air cap substantially free of coolant.

BRIEF DESCRIPTION OF THE INVENTION

Disclosed is an electric machine including a rotor and a stator positioned about the rotor. The stator includes a stator core having a plurality of stator teeth and a plurality of stator windings supported by the stator core about the plurality of stator teeth. The plurality of stator windings include a first end turn and a second end turn. The stator includes a plurality of interlocking insulators extending about corresponding ones of the plurality of stator teeth. Each of the plurality of interlocking insulators includes a first base portion extending circumferentially outwardly in a first direction and a second base portion extending circumferentially outwardly in a second direction. The first base portion being configured to inter-engage with a second base portion on an adjacent interlocking insulator to form a coolant passage and a coolant barrier about the air gap.

Also disclosed is an electric machine including a rotor and a stator positioned about the rotor. The stator includes a stator core having a plurality of stator teeth and a plurality of stator windings supported by the stator core about the plurality of stator teeth. The plurality of stator windings includes a first end turn and a second end turn. The stator includes a first end cover extending about the first end turn. The first end cover includes an inlet and defining a first annular fluid volume. A second end cover extends about the second end turn. The second end cover includes an outlet and defines a second annular fluid volume that is fluidically connected to the first annular fluid volume through the plurality of stator windings.

Further disclosed is an electric machine including a rotor and a stator positioned about the rotor. The stator includes a stator core having a plurality of stator teeth and a plurality of stator windings supported by the stator core about the plurality of stator teeth. The plurality of stator windings includes a first end turn and a second end turn. The stator including a plurality of interlocking insulators extending about corresponding ones of the plurality of stator teeth. Each of the plurality of interlocking insulators includes a first base portion extending circumferentially outwardly in a first direction and a second base portion extending circumferentially outwardly in a second direction. The first base portion is configured to inter-engage with a second base portion on an adjacent interlocking insulator to form a coolant passage and a coolant barrier about the air gap. A first end cover extends about the first end turn. The first end cover includes an inlet and defines a first annular fluid volume. A second end cover extends about the second end turn. The second end cover includes an outlet and defines a second annular fluid volume that is fluidically connected to the first annular fluid volume through the plurality of stator windings.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
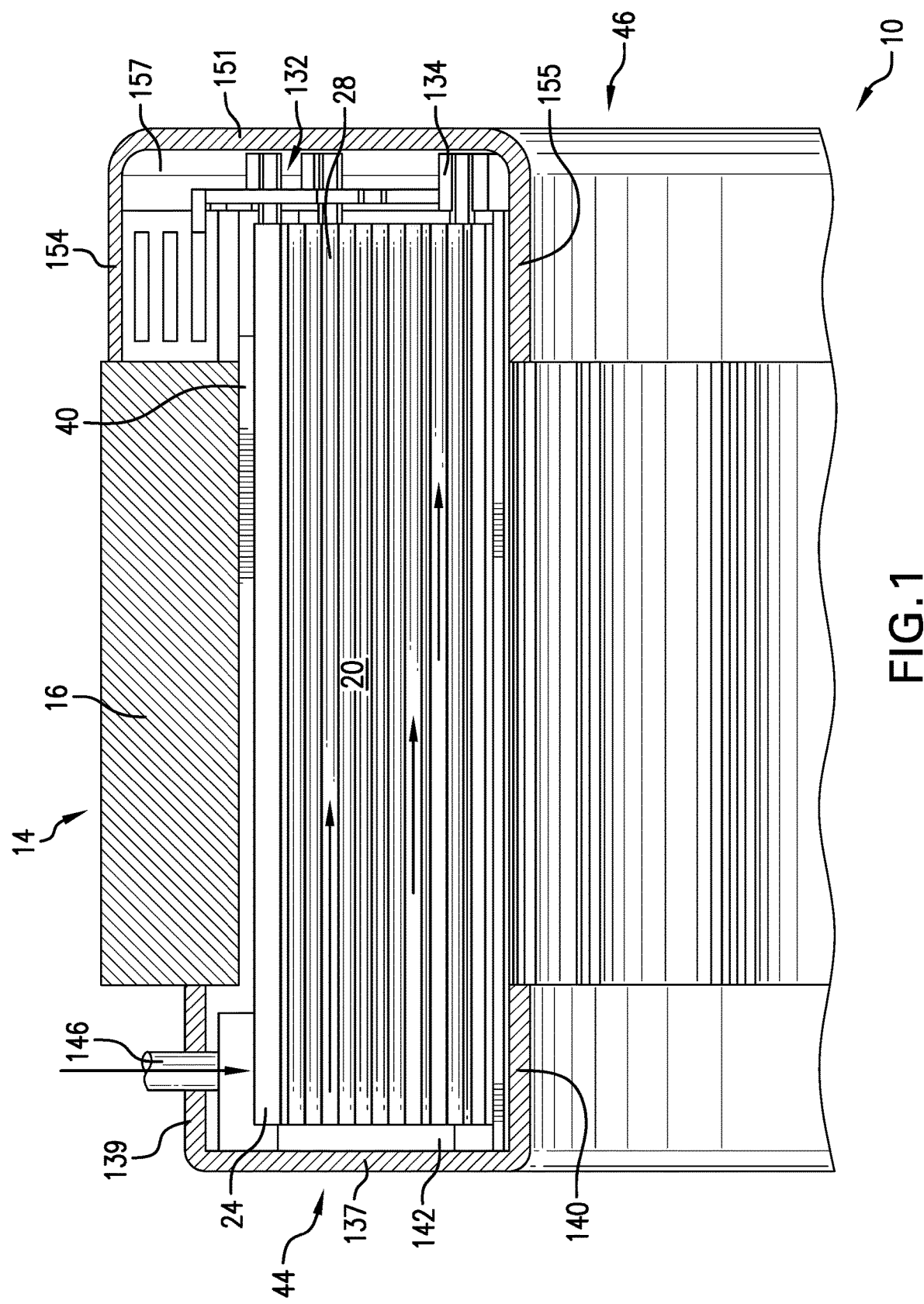
FIG. 1 depicts a partial cross-sectional view of a stator for an electric machine including an oil cooling system, in accordance with an exemplary aspect.
Figure 2:
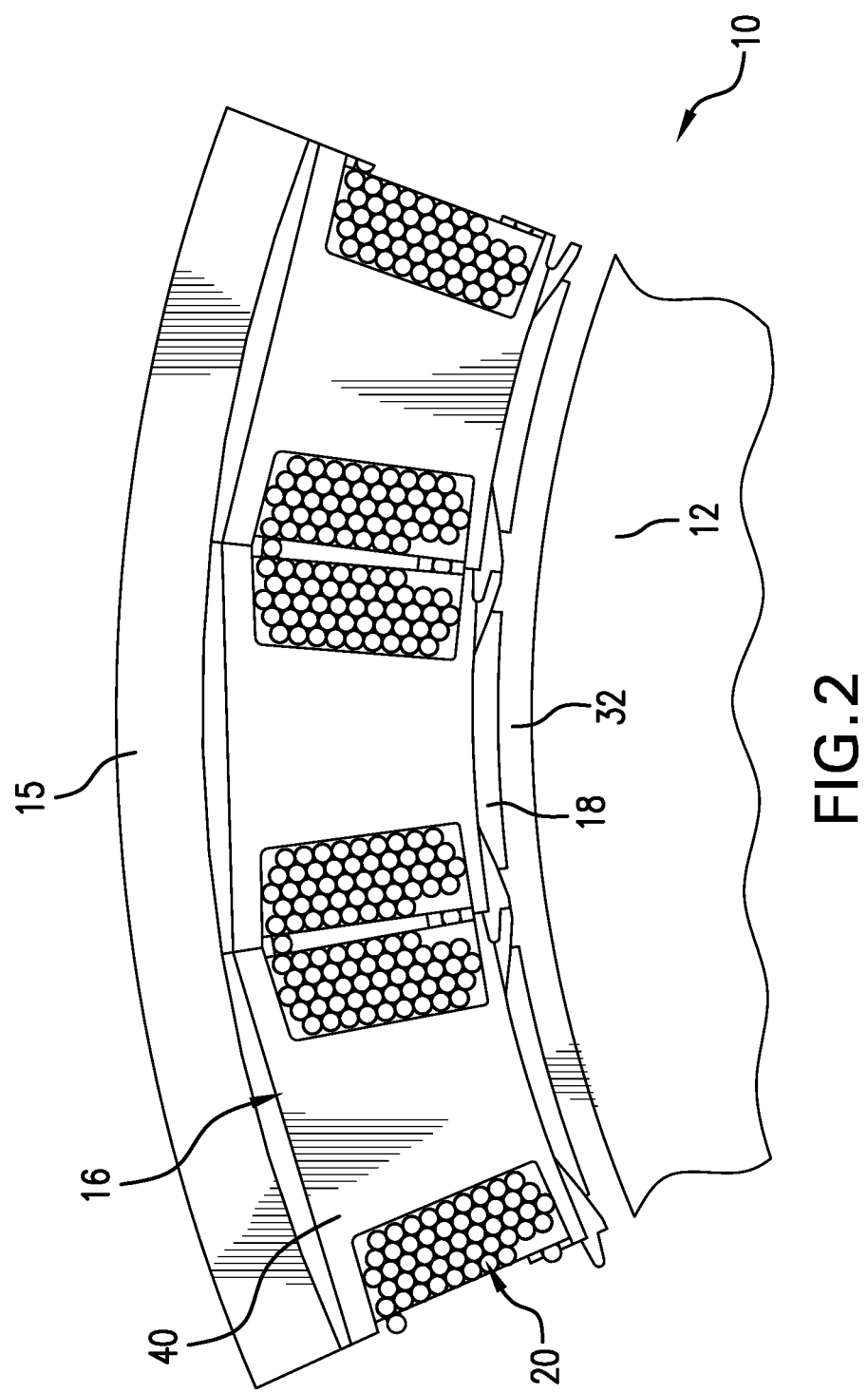
FIG. 2 depicts a partial axial end view of the electric machine according to FIG. 1.
Figure 3:
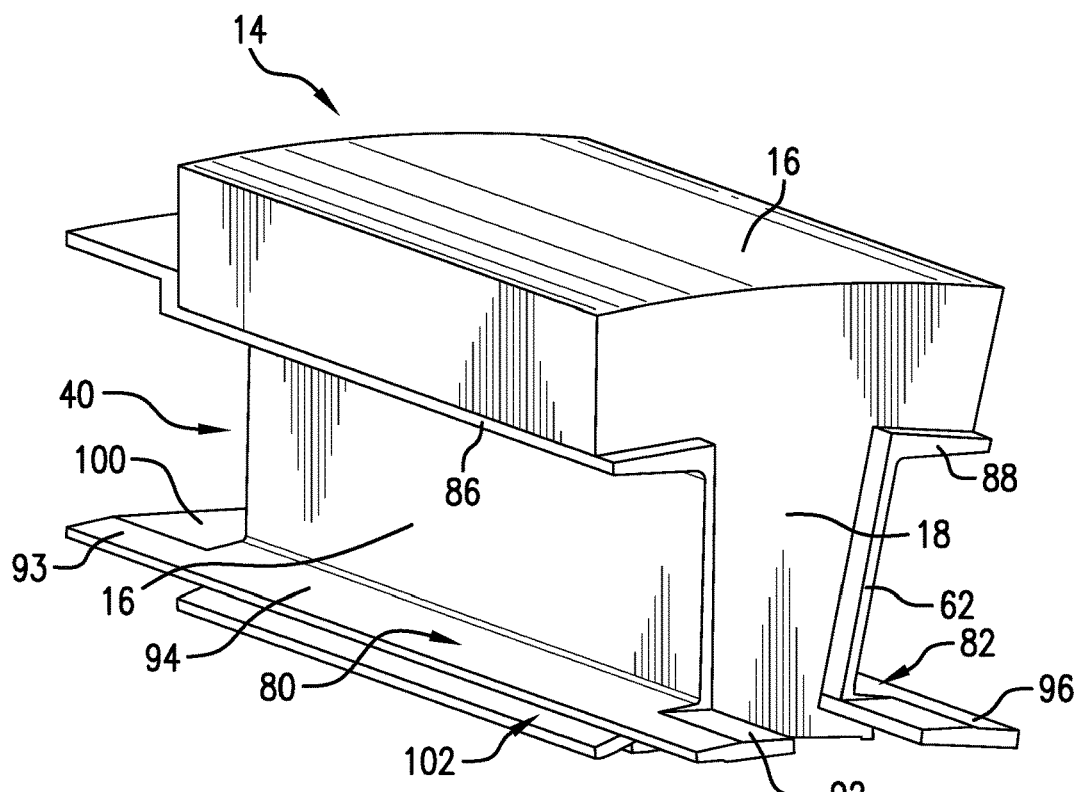
FIG. 3 depicts a plan view of an interlocking insulator positioned about a stator tooth of the stator of FIG. 1, in accordance with an exemplary aspect.
Figure 4:
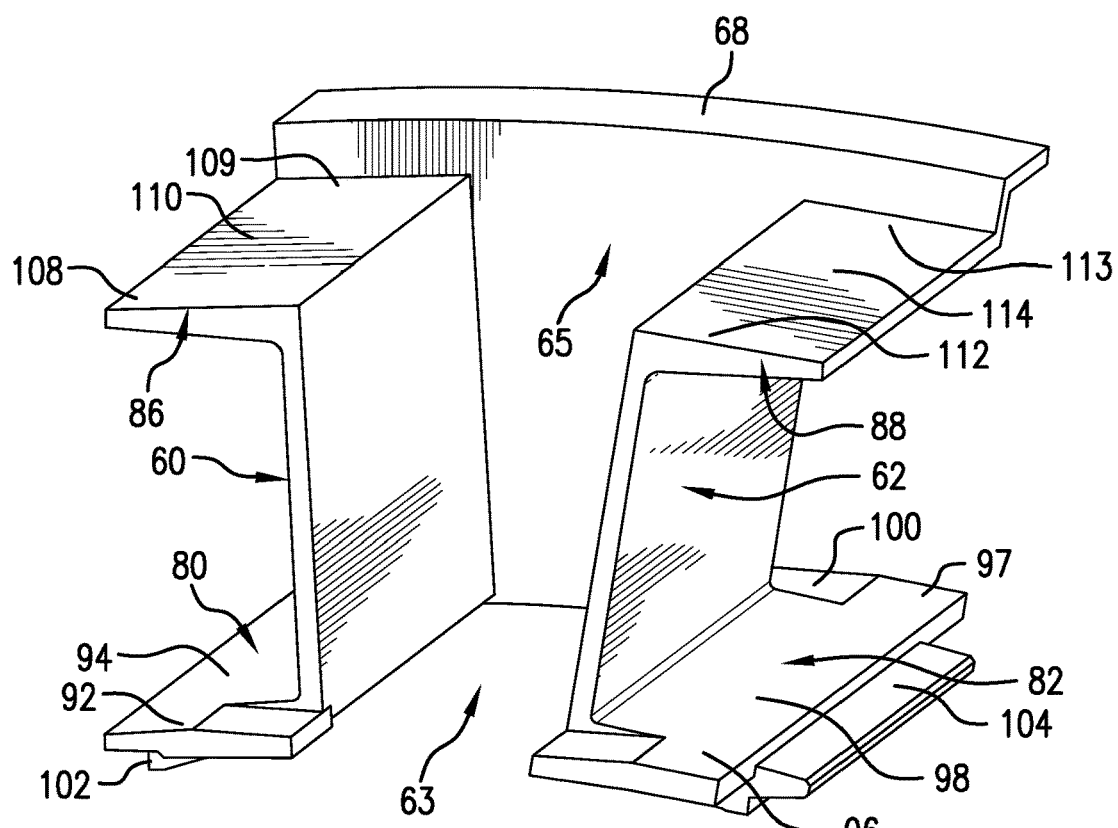
FIG. 4 depicts a plan view of one side of the interlocking insulator of FIG. 3, in accordance with an exemplary aspect.
Figure 5:
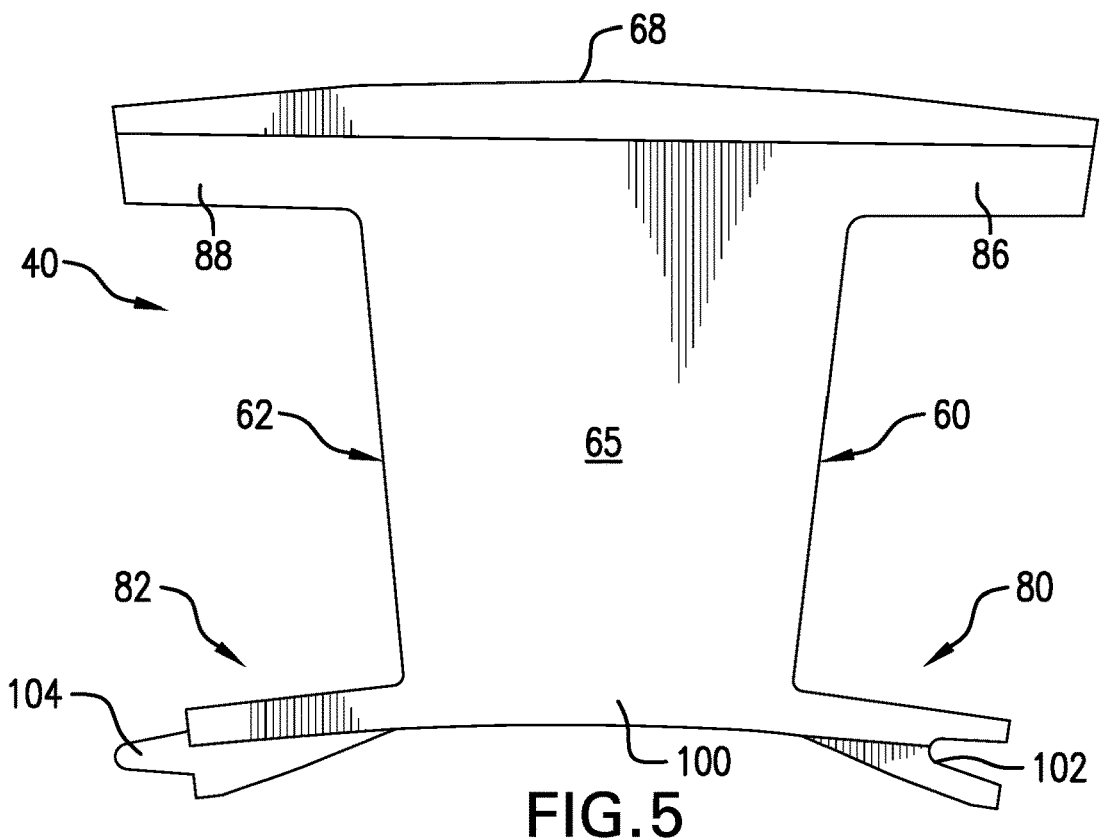
FIG. 5 depicts an elevational view of an opposing side of the interlocking insulator of FIG. 4, in accordance with an exemplary aspect.
Figure 6:
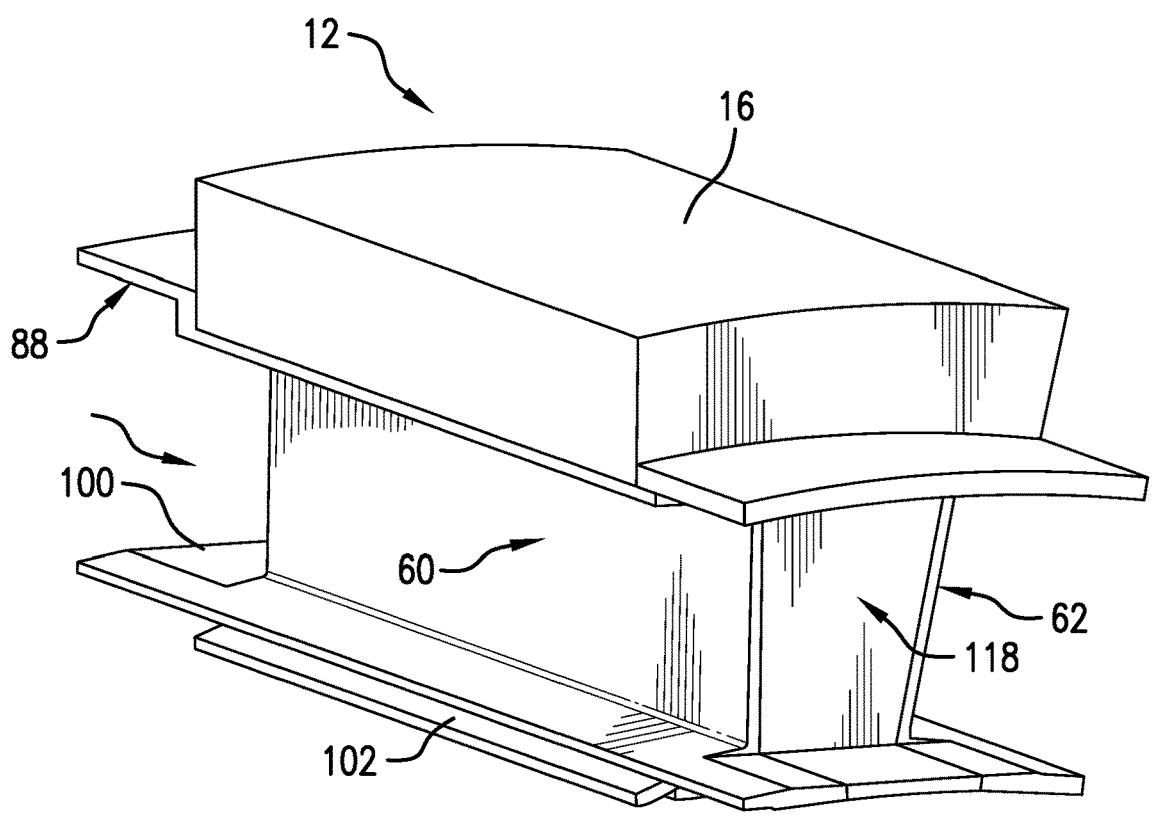
FIG. 6 depicts a plan view of the one side of the interlocking insulator of FIG. 4 showing an end cap, in accordance with an exemplary aspect.

An electric machine, in accordance with an exemplary embodiment, is indicated generally at 10 in FIG. 1. Electric machine 10 includes a rotor 12 (FIG. 2) and a stator 14 arranged in a housing 15. Stator 14 includes a stator core 16 from which extend a plurality of stator teeth 18. Stator teeth 18 support a plurality of concentrated wound (CW) stator windings 20 that define a first end turn 24 and a second end turn 28.

Stator 14 includes a plurality of interlocking insulators 40 that extend about each of the plurality of stator teeth 18. Stator 14 also includes a first end turn cover 44 positioned over first end turn 24 and a second end turn cover 46 positioned over second end turn 28. Stator 14 extends about and is spaced from rotor 12 by an air gap 32. As will be detailed herein, a liquid coolant, such as oil, is passed through CW stator windings 20 between first and second end turns 24 and 28 to remove heat from stator 14. Interlocking insulators 40 prevent coolant from entering air gap 32. While shown as being a concentrated wound stator, it should be understood that the exemplary embodiments would also benefit a distributed would stator.

Reference will now follow to FIGS. 3-7 in describing one of the plurality of interlocking insulators 40 with an understanding that others of the interlocking insulators 40 include similar structure. Each interlocking insulator 40 includes a first side portion 60 spaced from a second side portion 62 by a gap 63. First and second side portions 60 and 62 are positioned, and gap 63 is sized, to receive one of the plurality of stator teeth 18. First and second side portions 60 and 62 are joined at one end by an end wall 65 including a radiused outer wall 68.

Each interlocking insulator 40 further includes a first base portion 80 extending circumferentially outwardly of first side portion 60 and a second base portion 82 extending circumferentially outwardly of second side portion 62. A first outer edge 86 extends circumferentially outwardly of first side portion 60 radially spaced from base portion 80 and a second outer edge 88 extends circumferentially outwardly of second side portion 62 radially spaced from second base portion 82.

Figure 7:
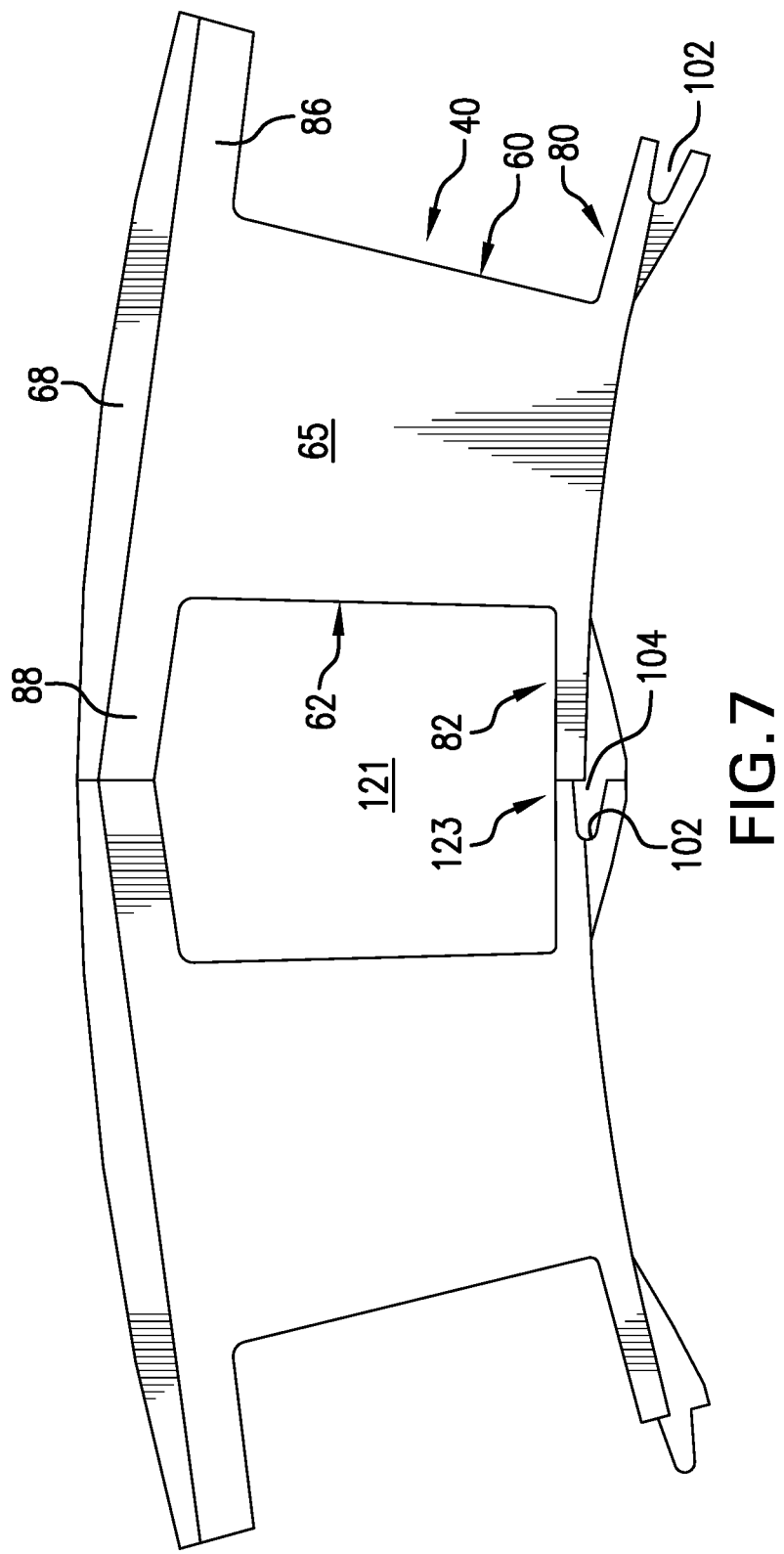
FIG. 7 depicts two interlocking insulators connected to each other, in accordance with an exemplary aspect.

First base portion 80 includes a first end 92, a second end 93 and an intermediate portion 94 extending therebetween. Second base portion 82 includes a first end section 96, a second end section 97, and an intermediate section 98 extending therebetween. Second end 93 is integrally joined to second end section 97 through an end section 100. First base portion 80 includes a tab receiver 102 extending circumferentially outwardly of intermediate portion 94 between first end 92 and second end 93. Second base portion 82 includes a tab 104 that extends circumferentially outwardly of intermediate section 98 between first end section 96 and second end section 97. Tab 104 is configured to engaged with a tab receiver 102 of an adjacent interlocking insulator as shown in FIG. 7.

First outer edge member 86 includes a first end 108, a second end 109, and an intermediate portion 110 extending therebetween. Second outer edge member 88 includes a first end portion 112, a second end portion 113, and an intermediate section 114 extending therebetween. Second end 109 of first outer edge member 86 is integrally joined to second end portion 113 of second outer edge member 88 through end wall 65.

An end cap 118 may be arranged between first side portion 60 and second side portion 62 and connected with first end 92 of first base portion 80, first end section 96 of second base portion 82, first end 108 of first outer edge member 86 and first end portion 112 of second outer edge member 88. End cap 118 extends across gap 63 such that interlocking insulator encapsulates the corresponding one of the plurality of stator teeth 18. When joined, a coolant passage 121 is defined between each adjacent pair of interlocking insulators 40. Further, first and second base portions interlock through engagement of tabs 102 and tab receivers 104 to form a coolant barrier 123 that prevents liquid coolant from passing from coolant passages 121 into air gap 32 as will be detailed herein.

Figure 8:
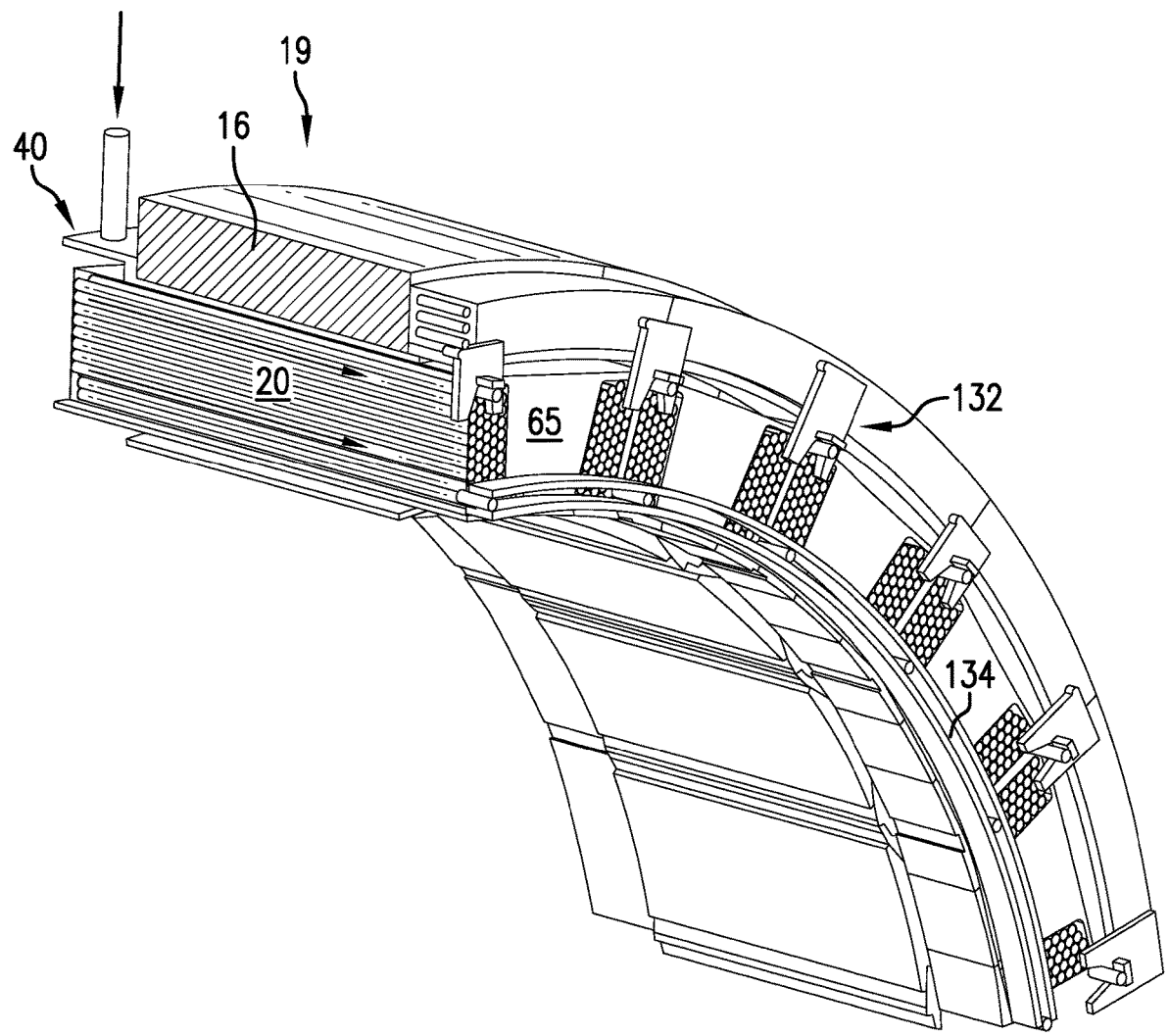
FIG. 8 depicts a partial cross-sectional view of the stator of FIG. 1, in accordance with an exemplary aspect.

As shown in FIG. 8, stator 14 includes a plurality of terminals 132 that are electrically connected with select ones of the plurality of CW stator windings 20. Stator 14 also includes a neutral bar 134 that is electrically connected with select ones of the plurality of CW stator windings 20. Terminals 132 and neutral bar 134 are covered by, for example, second end cover 46.

Figure 9:
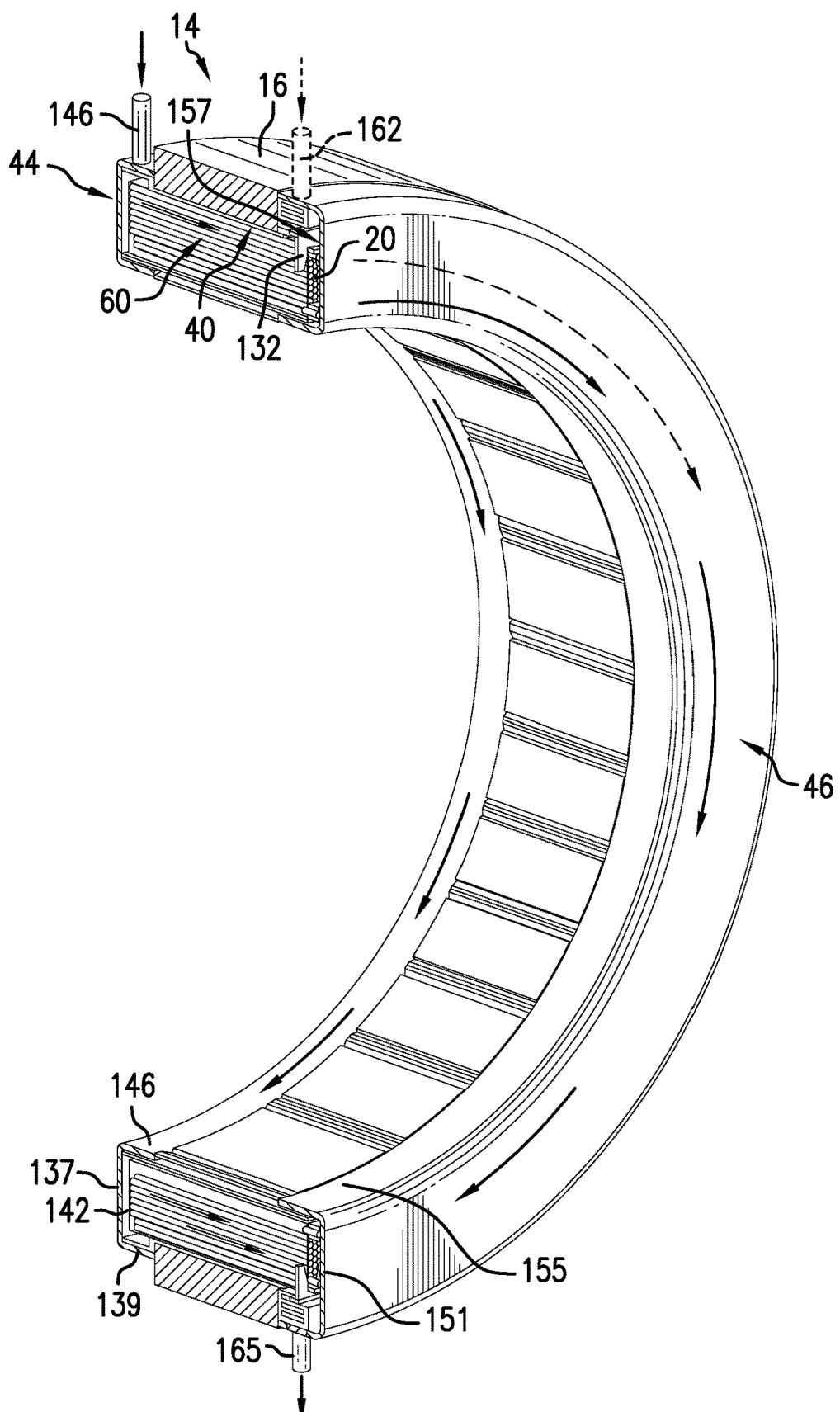
FIG. 9 depicts end covers positioned over the stator of FIG. 8, in accordance with an exemplary aspect.

In an embodiment depicts in FIGS. 1 and 9, first end cover 44 includes a first outer annular wall 137, a first radially outer wall 139 and a first radially inner wall 140. First outer annular wall 137, first radially outer wall 139 and first radially inner wall 140 are joined and collectively define a first annular fluid volume 142 having a C-shaped cross-section. An inlet 146 is positioned on first radially outer wall 139. Second end cover 46 includes a second outer annular wall 151, a second radially outer wall 154 and a second radially inner wall 155. Second outer annular wall 151, second radially outer wall 154 and second radially inner wall 155 are joined and collectively define a second annular fluid volume 157 having a C-shaped cross-section. An auxiliary inlet 162 may is positioned on second radially outer wall 154. An outlet 165 may also be positioned on second radially outer wall 154.

In operation, liquid coolant, such as oil, is introduced into first end cover 44 via inlet 146. The liquid coolant is introduced at a pressure greater than ambient. For example, the liquid coolant may be introduced at a pressure of about 1 psi. Of course, it should be understood that the pressure may vary and could depend upon various factors associated with a particular electric machine. The liquid coolant enters into and collects in first annular fluid volume 142 bathing or submerging first end turn 24 in liquid coolant and passes into second annular fluid volume 157 via coolant passages 121 to bathe of submerge second end turn 28 in liquid coolant.

The liquid coolant flows through interstitial spaces that exist between adjacent conductors forming the plurality of CW stator windings 20 that pass through each coolant passage 121. Coolant barrier 123 formed by interlocking adjacent first and second base portions 80 and 82 prevents or substantially reduces liquid coolant entering into air gap 32. The liquid coolant collects in second annular fluid volume 157 and pass from outlet 165 into, for example, a machine housing (not shown). If needed, additional coolant may be introduced into auxiliary inlet 162 to provide cooling to second end turn 28 and enhance heat exchange with stator 13. With this arrangement, liquid coolant may be in direct contact with CW stator windings 20 within stator core 16. That is, first end turn cover 46 and second end turn cover 48 create the first and second annular fluid volumes 142 and 157 that cause first and second end turns 24 and 28 to be flooded with liquid coolant to promote heat reduction with interlocking members forming a liquid barrier that ensures the air gap is coolant free.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a rotor; and
   a stator positioned about the rotor, the stator being spaced from the rotor by an air gap and including a stator core having a plurality of stator teeth and a plurality of stator windings supported by the stator core about the plurality of stator teeth, the plurality of stator windings including a first end turn and a second end turn, the stator comprising:
      a plurality of interlocking insulators extending about corresponding ones of the plurality of stator teeth, each of the plurality of interlocking insulators including a first base portion extending circumferentially outwardly in a first direction and a second base portion extending circumferentially outwardly in a second direction, the first base portion being configured to inter-engage with a second base portion on an adjacent interlocking insulator to form a coolant passage and a coolant barrier about the air gap;
      a terminal assembly electrically connected with the plurality of stator windings, the terminal assembly being fluidically exposed to the coolant passage; and
      a neutral bar electrically connected with the plurality of stator windings, the neutral bar being arranged in the one of the first and second annular fluid volumes.

2. The electric machine according to claim 1, wherein each of the interlocking insulators includes a first side portion extending radially outwardly of the first base portion and a second side portion extending radially outwardly of the second base portion, the first side portion being spaced from the second side portion by a gap receptive of one of the plurality of stator teeth.

3. The electric machine according to claim 2, wherein the first base portion includes a first end, a second end, and an intermediate portion extending axially along the air gap, and the second base portion includes a first end section, a second end section, and an intermediate section extending axially along the air gap, the first end being joined to the first end section.

4. The electric machine according to claim 3, wherein the first end is integrally formed with the first end section.

5. The electric machine according to claim 3, wherein each of the interlocking insulators includes a first outer edge member extending circumferentially outwardly of the first side portion spaced from the first base portion and a second outer edge extending circumferentially outwardly of the second side portion spaced from the second base portion.

6. The electric machine according to claim 5, wherein the first outer edge member includes a first end, a second end, and an intermediate portion extending axially through the stator core, and the second outer edge member includes a first end portion, a second end portion, and an intermediate section extending axially through the stator core, the first end of the first outer edge being joined to the first end portion of the second outer edge.

7. The electric machine according to claim 6, wherein the first end of the first outer edge is integrally joined to the first end portion of the second outer edge.

8. The electric machine according to claim 6, wherein each of the plurality of interlocking insulators includes an end section connecting the second end of the first base portion with the second end portion of the second base portion and the second end of the first outer edge with the second end portion of the second outer edge.

9. An electric machine comprising:
   a rotor; and
   a stator positioned about the rotor, the stator including a stator core having a plurality of stator teeth and a plurality of stator windings supported by the stator core about the plurality of stator teeth, the plurality of stator windings including a first end turn and a second end turn, the stator comprising:
      a first end cover extending about the first end turn, the first end cover including an inlet and defining a first annular fluid volume;
      a second end cover extending about the second end turn, the second end cover including an outlet and defining a second annular fluid volume that is fluidically connected to the first annular fluid volume through the plurality of stator windings;
      a terminal assembly electrically connected with the plurality of stator windings, the terminal assembly being arranged in one of the first and second annular fluid volumes; and
      a neutral bar electrically connected with the plurality of stator windings, the neutral bar being arranged in the one of the first and second annular fluid volumes.

10. The electric machine according to claim 9, wherein the second end cover includes another inlet.

11. The electric machine according to claim 9, wherein the first end cover includes a first outer annular wall, a first radially outer wall extending axially from the first outer annular wall, and a first radially inner wall extending from the first outer annular wall defining the first annular fluid volume.

12. The electric machine according to claim 11, wherein the first annular fluid volume includes a C-shaped cross-section.

* * * * *